(12) United States Patent
Lemberg

(10) Patent No.: US 9,210,153 B2
(45) Date of Patent: Dec. 8, 2015

(54) SYSTEM AND METHOD FOR ALTERNATIVE DISTRIBUTION OF A PERSONAL IDENTIFICATION NUMBER (PIN) CODE

(76) Inventor: Trond Lemberg, Skotbu (NO)

( * ) Notice: Subject to any disclaimer, the term of this patent is extended or adjusted under 35 U.S.C. 154(b) by 0 days.

(21) Appl. No.: 14/125,099

(22) PCT Filed: Jul. 12, 2012

(86) PCT No.: PCT/NO2012/050136
§ 371 (c)(1),
(2), (4) Date: Dec. 10, 2013

(87) PCT Pub. No.: WO2013/009191
PCT Pub. Date: Jan. 17, 2013

(65) Prior Publication Data
US 2014/0115681 A1    Apr. 24, 2014

(30) Foreign Application Priority Data

Jul. 13, 2011    (NO) .................................... 20111021

(51) Int. Cl.
*H04L 29/06*    (2006.01)
*H04W 4/14*    (2009.01)

(52) U.S. Cl.
CPC ............ *H04L 63/08* (2013.01); *H04L 63/0838* (2013.01); *H04L 63/18* (2013.01); *H04W 4/14* (2013.01)

(58) Field of Classification Search
CPC ................................. H04L 63/08; H04W 4/14
USPC ....................................................... 726/7, 19
See application file for complete search history.

(56) References Cited

U.S. PATENT DOCUMENTS

| 6,205,437 | B1 | 3/2001 | Gifford |
| 6,748,367 | B1* | 6/2004 | Lee ........................ G06Q 20/06 705/21 |
| 2004/0044904 | A1* | 3/2004 | Yamazaki ........... H04L 12/1822 726/29 |
| 2006/0174104 | A1* | 8/2006 | Crichton et al. ............... 713/155 |
| 2007/0113294 | A1* | 5/2007 | Field ..................... H04L 63/083 726/27 |
| 2008/0295166 | A1* | 11/2008 | Kasatani ................. H04L 51/18 726/19 |
| 2011/0047607 | A1 | 2/2011 | Chen et al. |
| 2011/0277023 | A1* | 11/2011 | Meylemans .......... G06F 21/335 726/7 |

FOREIGN PATENT DOCUMENTS

EP    2106099 A1    9/2009

OTHER PUBLICATIONS

International Search Report for International Application No. PCT/NO2012/050136 mailed Oct. 30, 2012, 3 pages.
Written Opinion of the ISA for International Application No. PCT/NO2012/050136 mailed Oct. 30, 2012, 3 pages.
Written Opinion of the IPEA for International Application No. PCT/NO2012/050136 mailed Jun. 13, 2013, 5 pages.

* cited by examiner

*Primary Examiner* — Dao Ho
(74) *Attorney, Agent, or Firm* — Oppedahl Patent Law Firm LLC

(57) ABSTRACT

System and method for distribution of a PIN code comprising an application end user in communication with an application server comprising at least one PIN code generating mechanism for authentication of an application end user, and a portable telecommunication device further characterized by that said application server is in communication with a synthetic voice PIN server also in communication with said portable telecommunication device.

6 Claims, 3 Drawing Sheets

SYSTEM AND METHOD FOR ALTERNATIVE DISTRIBUTION OF A PERSONAL IDENTIFICATION NUMBER (PIN) CODE

TECHNICAL FIELD

The present invention regards a system and a method for distributing a personal identification number (PIN) code to an end user, and more particularly a system and a method for distributing a PIN code to the end user when it is not possible to send it via SMS.

BACKGROUND OF THE INVENTION

When a user tries to access a server that requires an authentication of the user, one way of authentication is to send the user a PIN code by another means of communication. Such a means of communication is usually a mobile phone or of the like. The PIN code is sent to the user usually as an SMS on his or her registered phone. The user then types in the PIN code and gets access to the information on the server.

This method is widely used, but has its limitations. Under certain circumstances it can be a problem reaching the user with an SMS. An example is sending a SMS from a GSM network to a GSM phone user roaming in a CDMA network.

This is a problem e.g. for Europeans trying to receive a PIN code from a European site whilst being in America.

From U.S. Pat. Nos. 6,748,367 B1 and 6,205,437 B1 it is known a solution for distributing a PIN code to a cell phone either using SMS, e-mail, a phone call or similar.

The problem with these solutions is that they do not solve the problem mentioned above. Sending the PIN code with an e-mail reduces the security of the distribution since it is not sent through a different means of communication. Further sending it via an phone call is unnecessarily expensive since you need to have a person phoning the end user in a foreign country. Additionally, incorporating a person to distribute the PIN code reduces the security level of the authentication.

SUMMARY OF THE INVENTION

It is therefore the purpose of the present invention, as it is stated in the set of claims, to solve the problems mentioned above. This is done by sending the PIN code generated by the application server to a synthetic voice PIN server. The synthetic voice PIN server than converts the PIN code into an audio file. The audio file comprises a synthetic voice reading the PIN code. The synthetic voice PIN server calls the user and plays the audio file a predetermined number of times.

DETAILED DESCRIPTION

Figure 1:
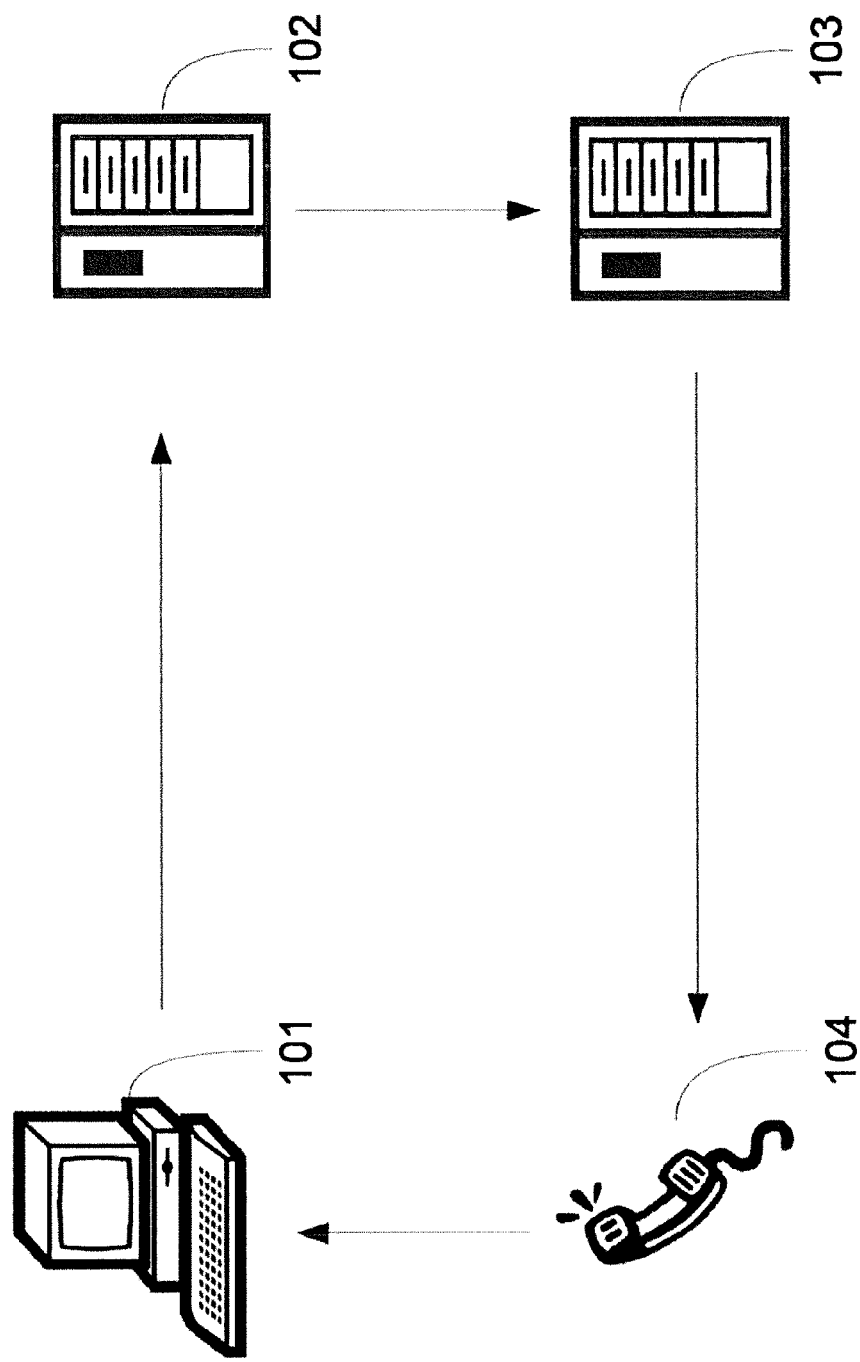
FIG. 1 is a schematic drawing of an embodiment of the present invention.

FIG. 1 is a schematic drawing of an embodiment of the present invention. The drawing shows the system and how the different parts are connected together.

The system comprises an end user 101 requesting access to information stored on an application server 102. The application server 102 generates a PIN code. The PIN code is sent to a synthetic voice PIN server 103 together with information about the end user 101. The synthetic voice PIN server 103 generates an audio file of the PIN code. The synthetic voice PIN server 103 phones the end user 101 on the validated phone number 104. The audio file is played to the end user 101 at least one time. The end user 101 types in the PIN code and get access to the information stored on or accessed through an application server.

Figure 2:
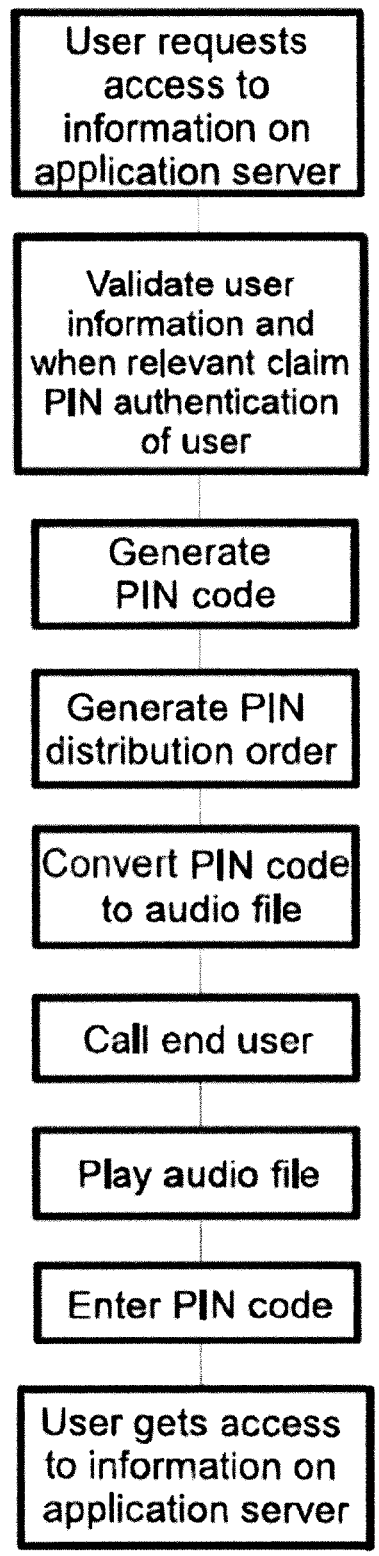
FIG. 2 is a flow chart of an embodiment of the present invention.

FIG. 2 is a flow chart of the embodiment of the present invention as it is shown in FIG. 1. An end user 101 is requesting access to information. The information is stored on an application server 102.

The request triggers an authentication and validation of the user. In order to authenticate the user the application server generates a PIN code. The application server generates a PIN code distribution order. The PIN code distribution order includes the generated PIN code and information about end user.

The information about the end user is at least a validated phone number registered to the end user. The information about the end user can be based on a PKI or other type of certificate holding information of the user and the phone that the application may trust, or similar. It can be based on a symbol particular to the end user, a PKI based security program downloaded to the mobile phone of the user downloaded from a source that the application server trusts or similar.

The PIN distribution order is sent to a synthetic voice PIN server. The synthetic voice PIN server converts the PIN code to an audio file. The synthetic voice PIN server retrieves the phone number from the PIN distribution order. The synthetic voice PIN server calls the end user. The audio file is played to the end user a predetermined number of times. The end user types in the PIN code and gets access to the information stored on or accessed through the application server.

Figure 3:
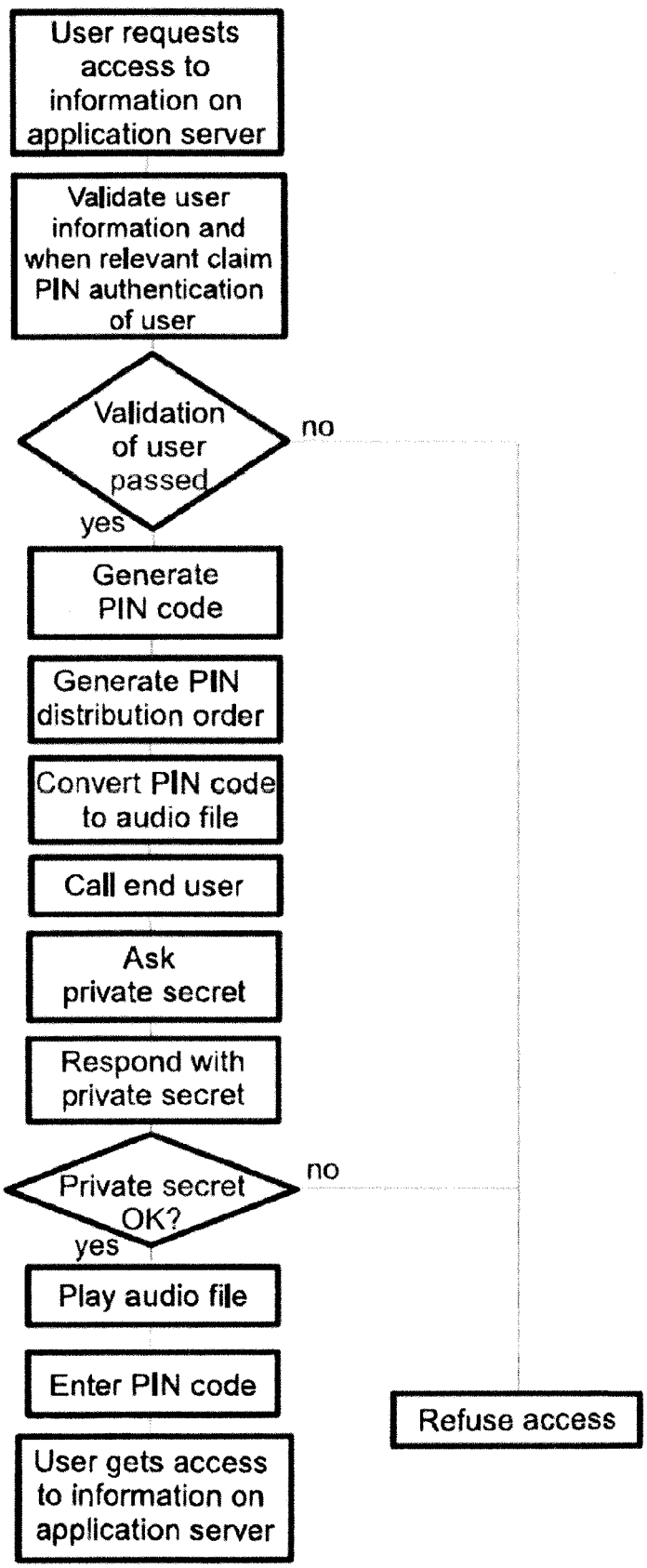
FIG. 3 is a flow chart of an alternative embodiment of the present invention.

FIG. 3 is a flow chart of an alternative embodiment of the present invention. Here the end user requests access to information stored on or accessed through an application server. The request triggers a PIN authentication of the user. The application server validates the trustworthiness of the end user's mobile phone through a security policy. If it is accepted the method proceeds to the next level.

The application server generates a PIN code and a PIN code distribution order. The PIN code distribution order includes the PIN code and user information. The user information is at the least a validated phone number registered to the end user. Further the user information includes a hash value of his or her private secret.

The PIN code distribution order is sent to a synthetic voice PIN server. The synthetic voice PIN server calls the end user on the phone number from the PIN distribution order.

The synthetic voice PIN server asks the end user for the private secret from the distribution order. The private secret is agreed upon between the end user and either the PIN server or Application Server prior to the request sent from the end user.

If the end user gives the correct answer to the private secret the method proceed to the next level. The Synthetic voice PIN server converts the PIN code to an audio file. The audio file is a synthetic voice reading the PIN code. The audio file is played for the end user a predetermined number of times.

When the PIN is typed in the end user gets access to the information stored on the application server.

Furthermore the methods described above can be part of a larger authentication framework consisting of several types of authentication.

The private secret can be either in the form of a predetermined word, phrase or number agreed upon previously or the synthetic voice PIN server can use voice recognition to identify the end user.

Alternatively the security validation of the phone number belonging to the end user can be based on different sources the application server trusts. It can manually check the public register, a physical phone call, verify a certificate providing a mobile phone number to use as an identity parameter or check any kind of register or database that the application server may have access to and trust.

The term "Application server" is a conceptual term, and can in principal be any unit that requires authentication of another party before the communication is initiated. E.g. authentication towards a storage of encryption keys in an machine unit.

The term "User Information" can be any type of information used to identify an entity and/or implicit a session used in the communication.

The term "User" is not restricted to a physical person, but can be any form of entity capable of communicating with the application server.

The invention claimed is:

1. A system for distributing a personal identification number (PIN) code comprising:
   an application server, a PIN-code generator, a synthetic voice PIN-server, and at least one telecommunication device;
   wherein an end user requests access to the application server, the request triggering a PIN authentication and validation of the user;
   the application server generates and sends a PIN-code distribution order to a synthetic voice PIN server;
   the synthetic voice PIN-server converts the PIN-code to an audio file and calls the at least one telecommunication device belonging to the end user;
   wherein the PIN-code distribution order comprises: a PIN-code and user information in the form of a phone number and a hash value of a private secret agreed upon by the end user and the application server;
   the synthetic voice PIN-server asking the end user for the private secret;
   the end user responding with the private secret;
   the synthetic voice PIN-server playing the audio file a predetermined number of times; and
   the end user entering the PIN-code.

2. The system as defined in claim 1 wherein the end user can be a random user or a previously registered user.

3. The system as defined in claim 1 wherein the end user can be any form of entity capable of communicating with the application server.

4. A method for distribution of a personal identification number (PIN) code comprising:
   requesting, by an end user, access to an application server;
   triggering, by the request, a PIN-code authentication and validation of the end user;
   generating, by the application server, a PIN-code distribution order and sending the PIN-code distribution order to a synthetic voice PIN server;
   converting, by the synthetic voice PIN-server, the PIN code in an audio file and calling at least one telecommunication device belonging to the end user;
   wherein the PIN-code distribution order comprises a PIN-code and user information in the form of a phone number and a hash value of a private secret agreed upon by the end user and the application server;
   asking, by the synthetic voice PIN-server, the end user for the private secret, the end user responding with the private secret, and the synthetic voice PIN-server playing the audio file a predetermined number of times; and
   entering, by the end user, the PIN code.

5. The method as defined in claim 4 wherein the end user can be a random user or a previously registered user.

6. The method as defined in claim 4 wherein the end user can be any form of entity capable of communicating with the application server.

* * * * *